US010748510B2

(12) United States Patent
Keramidas et al.

(10) Patent No.: US 10,748,510 B2
(45) Date of Patent: Aug. 18, 2020

(54) FRAMEBUFFER COMPRESSION WITH CONTROLLABLE ERROR RATE

(71) Applicant: THINK SILICON SA, Patras (GR)

(72) Inventors: Georgios Keramidas, Patras (GR);
Iakovos Stamoulis, Patras (GR);
Yannis Economou, Patras (GR);
George Sidiropoulos, Patras (GR)

(73) Assignee: THINK SILICON SA, Patras (GR)

( * ) Notice: Subject to any disclaimer, the term of this patent is extended or adjusted under 35 U.S.C. 154(b) by 0 days.

(21) Appl. No.: 15/873,662

(22) Filed: Jan. 17, 2018

(65) Prior Publication Data

US 2018/0144725 A1 May 24, 2018

Related U.S. Application Data

(63) Continuation of application No. 13/729,841, filed on Dec. 28, 2012, now Pat. No. 9,899,007.

(51) Int. Cl.
*G09G 5/395* (2006.01)
*G09G 5/393* (2006.01)
(Continued)

(52) U.S. Cl.
CPC .............. *G09G 5/395* (2013.01); *G06T 11/40* (2013.01); *G09G 5/393* (2013.01); *G09G 3/2092* (2013.01);
(Continued)

(58) Field of Classification Search
CPC ............ G09G 2360/122; G09G 3/2092; G06F 1/266; G06F 1/3203
(Continued)

(56) References Cited

U.S. PATENT DOCUMENTS 6,154,493 A * 11/2000 Acharya ................ H04N 1/648
348/398.1
6,411,295 B1 6/2002 Hung et al.
(Continued)

OTHER PUBLICATIONS

Shim et al., "A compressed Frame Buffer to Reduce Display Power Consumption in Mobile Systems" Proceedings of the 2004 Asia and South Pacific Design Automation Conference (2004).
(Continued)

*Primary Examiner* — Hai Tao Sun
(74) *Attorney, Agent, or Firm* — Jason H. Vick; Sheridan Ross, PC

(57) ABSTRACT

The device and method described in this application relate generally to graphics processing systems utilizing the tile based rendering technique and more specifically relate to the processing of the framebuffer data in graphics processing applications. The present invention discloses techniques to reduce the bandwidth needed to access the color data stored in the framebuffer. A method for adaptive lossy delta based compression of color data is disclosed. The error rate, that is the amount of color data lost during the lossy compression process, is controlled by various parameters of the rendered tiles produced by the graphics processing system. The compression process is driven by a dedicated unit which enables informed compression decisions with controllable error rate so as the output color data can be reliably decompressed to produce the original color data with minimal or no errors.

10 Claims, 7 Drawing Sheets

(51) Int. Cl.
*G06T 11/40* (2006.01)
*G09G 3/20* (2006.01)

(52) U.S. Cl.
CPC ..... *G09G 2350/00* (2013.01); *G09G 2360/12* (2013.01); *G09G 2360/122* (2013.01)

(58) Field of Classification Search
USPC ......................................................... 345/549
See application file for complete search history.

(56) References Cited

U.S. PATENT DOCUMENTS

| | | | |
|---|---|---|---|
| 8,031,937 B2 | 10/2011 | Rasmusson et al. | |
| 2003/0003942 A1 | 1/2003 | Okumura | |
| 2008/0238928 A1 | 10/2008 | Poddar et al. | |
| 2008/0247641 A1* | 10/2008 | Rasmusson | G06T 11/40 382/166 |
| 2009/0100125 A1 | 4/2009 | McDowell | |
| 2010/0060629 A1 | 3/2010 | Rasmusson et al. | |
| 2010/0177105 A1 | 7/2010 | Nystad et al. | |
| 2010/0265525 A1* | 10/2010 | Hagiwara | G06T 9/00 358/1.9 |
| 2011/0074800 A1 | 3/2011 | Stevens et al. | |
| 2011/0080419 A1* | 4/2011 | Croxford | G09G 5/393 345/531 |
| 2011/0102446 A1 | 5/2011 | Oterhals et al. | |
| 2011/0115806 A1 | 5/2011 | Rogers | |
| 2011/0216829 A1 | 9/2011 | Raveendran | |
| 2012/0050303 A1 | 3/2012 | McAllister et al. | |
| 2013/0034309 A1 | 2/2013 | Nystad et al. | |
| 2013/0249897 A1* | 9/2013 | Dunaisky | G06T 5/002 345/419 |
| 2013/0314429 A1 | 11/2013 | Croxford et al. | |
| 2014/0098886 A1* | 4/2014 | Crenshaw | H04N 19/176 375/240.16 |
| 2014/0192075 A1 | 7/2014 | Stamoulis et al. | |

OTHER PUBLICATIONS

Shim et al., "Frame Buffer Compression Using a Limited-Size Code Book for Low-Power Display Systems" Proceedings of IEEE Workshop on Embedded Systems for Real-Time Multimedia, pp. 7-12 (2005).
Office Action for U.S. Appl. No. 13/729,841, dated Nov. 13, 2014.
Office Action for U.S. Appl No. 13/729,841, dated Apr. 23, 2015.
Office Action for U.S. Appl. No. 13/729,841, dated Mar. 2, 2016.
Office Action for U.S. Appl. No. 13/729,841, dated Aug. 18, 2016.
Office Action for U.S. Patent Application No. 13/729,841, dated Jan. 6, 2017.
Notice of Allowance for U.S. Appl. No. 13/729,841, dated Oct. 5, 2017.

* cited by examiner

FRAMEBUFFER COMPRESSION WITH CONTROLLABLE ERROR RATE

CROSS REFERENCE TO RELATED APPLICATION

This application is a Continuation of U.S. patent application Ser. No. 13/729,841, filed Dec. 28, 2012, now U.S. Pat. No. 9,899,007, the entirety of which is incorporated herein by reference.

BACKGROUND OF THE INVENTION

Field of the Invention

The present invention relates generally to graphics rendering, and in particular, to compressing and decompressing framebuffer fragment data in a vector, 2D and/or 3D graphics rendering system, aiming to reduce memory usage and bandwidth requirements.

Background Art

A typical graphics rendering subsystem 100 is depicted schematically on FIG. 1 as a high level diagram of a specific implementation of a tile based graphics processing system 201 that is in accordance with the present invention. However, the technology described in this application is generally applicable in tile based rendering systems of different arrangements.

The specific arrangement of the graphic processing system includes a graphics processing unit (GPU) 200, which contains, inter alia, the tile based rendering logic 201. As is known in the art, the tile based hardware generates tiles of an output frame that is to be displayed on a display device 106 such as a LCD screen.

The tile based rendering technique is a method, according to which the two dimensional output array, frame or screen of the rendering process is subdivided or partitioned into a number of smaller two-dimensional regions usually referred as tiles. Each tile is rendered separately, either one after another or in parallel to the other tiles. The rendered tiles are then compiled to provide the complete output array or frame. The tiles generated by the tile rendering logic are typically saved in the framebuffer in a tile-by-tile basis. In mobile systems that are typically characterized by limited bandwidth, the tile based rendering approach, where a fragment may be read and written several times through the rendering process, reduces off-chip memory accesses.

Once a tile has been produced by the graphics hardware, it would then normally be written to a framebuffer 600 in the memory 104 (which memory may be typically a DDR-SDRAM) through an interconnection network 102 (write path 103). In the specific arrangement, the framebuffer is hosted in the system main memory, however different arrangements may be assumed, i.e., the framebuffer can be a separate off-chip memory or can be a separate, on-chip memory (either an SRAM or an embedded DRAM) residing in the display controller 107.

At regular intervals, the framebuffer 600 will be read by the display controller 107 in order to output the frame generated by the tile rendering logic 201 (read path 105) to the display. For the sake of completeness, the arrangement shown in FIG. 1 contains a host CPU 101, although this is not necessary. The bandwidth requirements to display even a static image on such as devices is relatively high, and data compression is a method that can be used to reduce the requirements on memory and bandwidth.

As mentioned, without loss of generality, we assume that the framebuffer is located in an off-chip random access memory (which memory may be DDR-SDRAM), which is typically the system main memory. The framebuffer at any given time contains a complete frame of data. The information in the framebuffer typically consists of color values for every fragment on the screen. Color values are commonly stored in 16-bit color or 24/32-bit color formats. An additional alpha channel is sometimes used to retain information about pixel transparency. The total amount of the memory required to drive the framebuffer depends on the resolution of the output display and on the color depth.

The rendering tiles that the output is divided into for rendering purposes, can be of any desired and suitable size or shape. The rendered tiles are preferably all the same size and shape, as is known in the art, although this is not necessary. Without loss of generality we assume that (and unless it is mentioned otherwise), each rendered tile is rectangular and the preferred size and shape is 16×16 fragments.

The applicants have identified as by others skilled in the art that memory bandwidth and memory accesses required to write every new tile generated by the tile rendering logic to the framebuffer and memory bandwidth and memory accesses required to read the generated tiles from the framebuffer by the display or the display controller can be significantly reduced if a sophisticated lossy or lossless compression technique is applied to every new generated tile. The method described in this application provides an adaptive compression technique tailed to the operation of a tile based rendering system.

There have been several disclosed methods for reducing framebuffer bandwidth: e.g. US2011/0074800 and US2011/0102446 where they try to eliminate redundant framebuffer access, US 2010/0060629 where they use errors introduced by various pipeline stages to decide how to handle tile fragments, U.S. Pat. No. 6,411,295 where they apply compression principles for reducing z-buffer memory accesses.

BRIEF SUMMARY OF THE INVENTION

The disclosed invention method and device provide a system for compressing and decompressing tiles and a methodology for an adaptive lossy delta based compression of color data.

The applicants have identified, also mentioned by others skilled in the art, that for many graphics and video operations, a significant number of the rendered tiles in each frame does not change, thus significant memory bandwidth savings can be achieved by identifying those unchanged tiles at run-time and orchestrating the aggressiveness of a lossless compression technique based on the update rate of the rendered tiles. In specific graphic applications (e.g., those that for most of the time only the mouse pointer moves), the rate of unchanged tiles can be very high (up to or greater than 95%).

A typical scene is composed of many triangles. As each triangle covers a number of pixels, the number fragments to be written to the display memory can be large. For instance, a scene may be composed of 1,000,000 triangles, each of which may cover 50 pixels. If the scene is rendered 60 times a second, 3,000,000,000 fragments must be generated, processed and sent to the framebuffer every second. If each such fragment carries about 4 bytes of data, 12 Gbytes of data must be processed and stored every second (absent the technology described in this application). There is thus a need for a graphics processing technique that addresses these problems i) by compressing fragments as they travel through the graphics system, and ii) by storing them in a compressed format in the framebuffer in memory utilizing the technology described in this application.

BRIEF DESCRIPTION OF THE DRAWINGS

The aspects and advantages of the present invention are better understood from the following detailed description of a preferred embodiment of the invention with reference to the drawings, in which.

DETAILED DESCRIPTION OF THE INVENTION

Figure 1:
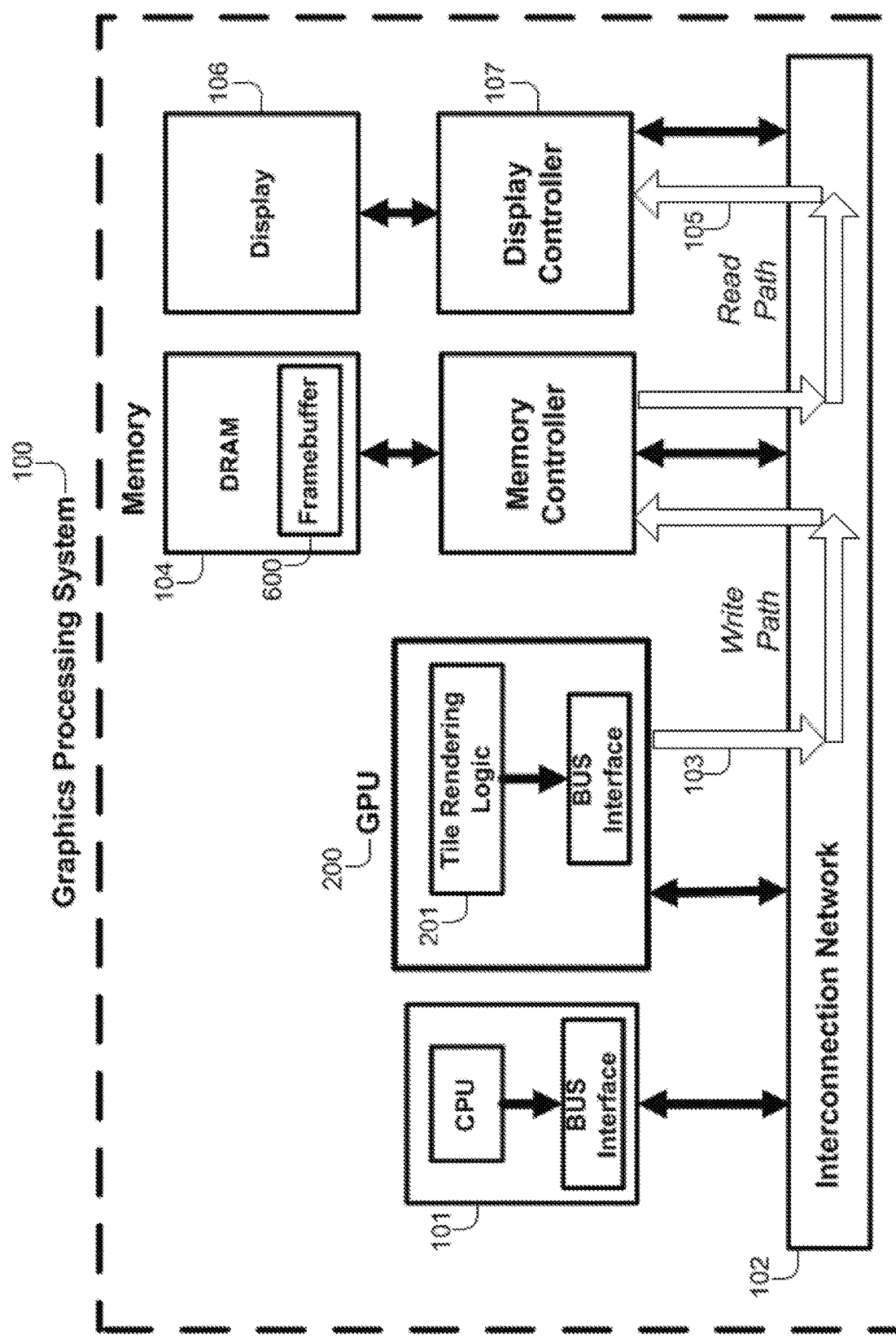
FIG. 1 illustrates a detailed block diagram of the graphics subsystem of a embedded device.

The present invention relates to graphics processing systems and in particular to framebuffer generation and related operations in graphics processing systems. As is known in the art, the output of a graphics processing system is usually written to an output framebuffer in memory when it is ready for display. The framebuffer is then read by a display controller and output to the display, which may be a LCD screen, for display.

The information in the framebuffer typically consists of color values for every pixel (point that can be displayed) on the screen. Color values are commonly stored in 16-bit color and 24/32-bit color formats. An additional alpha channel is sometimes used to retain information about pixel transparency. The total amount of the memory required to drive the framebuffer depends on the resolution of the output display and the color depth.

The writing of graphics data to the framebuffer consumes a relatively significant amount of power and memory bandwidth, particularly where, as is typically the case, the framebuffer resides in memory that is external to the graphics processor. For example, a new frame may need to be written to and read from the framebuffer at rates of 60 frames per second (fps) or higher, and each frame can require a significant amount of data, particularly for higher resolution displays and high definition (HD) graphics.

As it can be understood by those skilled in the art, it is desirable to try to reduce the power consumption of framebuffer operations and various techniques have been proposed to try to achieve this. These techniques include providing an on-chip framebuffer, framebuffer caching, framebuffer compression and dynamic color depth control. However, each of these techniques has its own drawbacks and disadvantages.

For example, using an on-chip framebuffer, especially for higher resolution displays, may require a large amount of on-chip resources. Framebuffer caching is not, in general, practical because the frame generation process is typically asynchronous to framebuffer display. Framebuffer compression is a promising technique, but if it is not performed in a carefully way, a significant reduction in the quality of the rendered image may be encouraged. In addition, the current framebuffer compression techniques are also too complex alleviating the premise of an overall power efficient solution.

Therefore, the applicants of the present invention deem there is scope for improvements to framebuffer generation and similar operations in graphics processing systems. In addition, the applicants believe that what is needed in the art is a system and a method for compressing color data without compromising the quality of the output image or a compression technique which will be able to create controllable errors in a way that the amount of color data lost during the compression process (lossy compression) will not have a significant impact on the quality of the output image.

The applicants want to make clear that the methods and devices described in this invention are suitable for graphic processing systems utilizing the tile rendering technique. However, the present invention is more generally applicable and it can be applied in all kinds of data rendering systems in which the overall output screen can be divided into regions or blocks. Each region or block represents a specific part of the overall frame and those regions or blocks can be also overlapped if desired.

As is known in the art, also illustrated in FIG. 1, the framebuffer 600 is accessed by the graphics processing hardware 200 via write operations 103 when a new generated tile is ready (the event to trigger a write transaction is the generation of a new tile) and by the display controller 107 via read operations 105. The frequency of the read transactions is dictated by the refresh rate of the display screen 106 (which may be a LCD or a TFT LCD screen).

Figure 2:
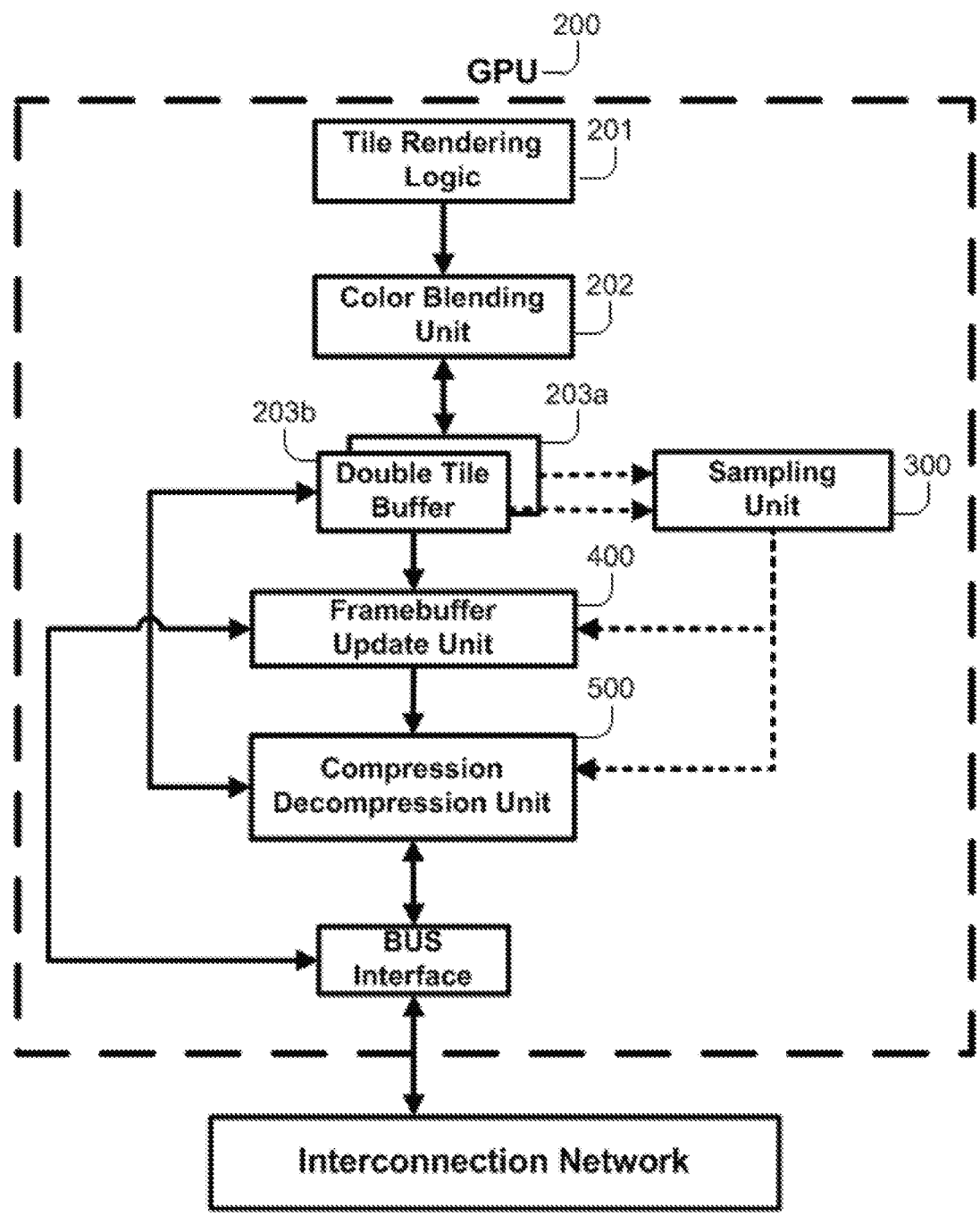
FIG. 2 illustrates a block diagram of all the additional components required according to the aspects in the present embodiment.

In accordance with the present invention, the above mentioned process (read and write transactions) is modified by the use of two hardware units namely the framebuffer update unit (FUU) 400 and the compression unit (CU) 500 (as it can be shown in FIG. 2). In addition and according to the present invention another hardware unit is introduced in the design, namely the sampling unit (SU) 300. Specific embodiments of the three hardware units that are in accordance to the aspects proposed in the present invention are presented hereafter.

Beyond the instantiation of specific embodiments of the three above mentioned hardware units (i.e., the FUU, the CU, and the SU), one more major arrangement is needed in the design with respect to a typical graphic processing system as it is presented in FIG. 1. In a preferred embodiment, two on-chip tile buffers are required. For instance, FIG. 2 shows a first tile buffer 203a and a second tile buffer 203b. Each of these tile buffers should provide sufficient capacity to store an entire frame tile. The role of this double buffering arrangement is to store the color data produced during the rendering of two consecutive frame tiles. A blending unit 202 is also included in the design to perform the color blending operations.

Thus, together, the two tile buffers (203a and 203b) may store pixel data for two consecutive rendered tiles. For instance, data for a sequence of tiles may be alternatively stored in tile buffer 203a and tile buffer 203b. Considering a sequence of four consecutive tiles, pixel data for the first tile may be stored in tile buffer 203a, pixel data for the second tile may be stored in tile buffer 203b, pixel data for the third tile may be stored in tile buffer 203a, and pixel data for the fourth tile may be stored in tile buffer 203b.

This alternate storage may be performed through a "flip" command (not shown in FIG. 2). According to this command, one of tile buffers (called the back buffer) is designated to receive pixel data from the tile rendering logic corresponding to a particular tile. In contrast, the other tile buffer (called the front buffer) can be used for further processing by the FUU 400 and by the CU 500 units that are introduced in the tile rendering pipeline in accordance to the aspects of the present invention. In such way, the tile rendering process will not be interrupted by the extra processing required by the FUU and the CU.

Upon the tile rendering logic finishes the rendering of a new tile (stored in the back buffer) and when the FUU 400 and the CU 500 components finish their operation in the previous tile (stored in the front buffer), a flip command switches the front and back buffer designations. As a result, the tile buffers 203a and 203b alternately store data for a sequence of tiles. Although FIG. 2 shows an implementation having two tile buffers, the embodiments are not so limited. For instance, implementations may include other quantities of tile buffers. For instance, embodiments may employ three or more tile buffers.

Figure 3A:
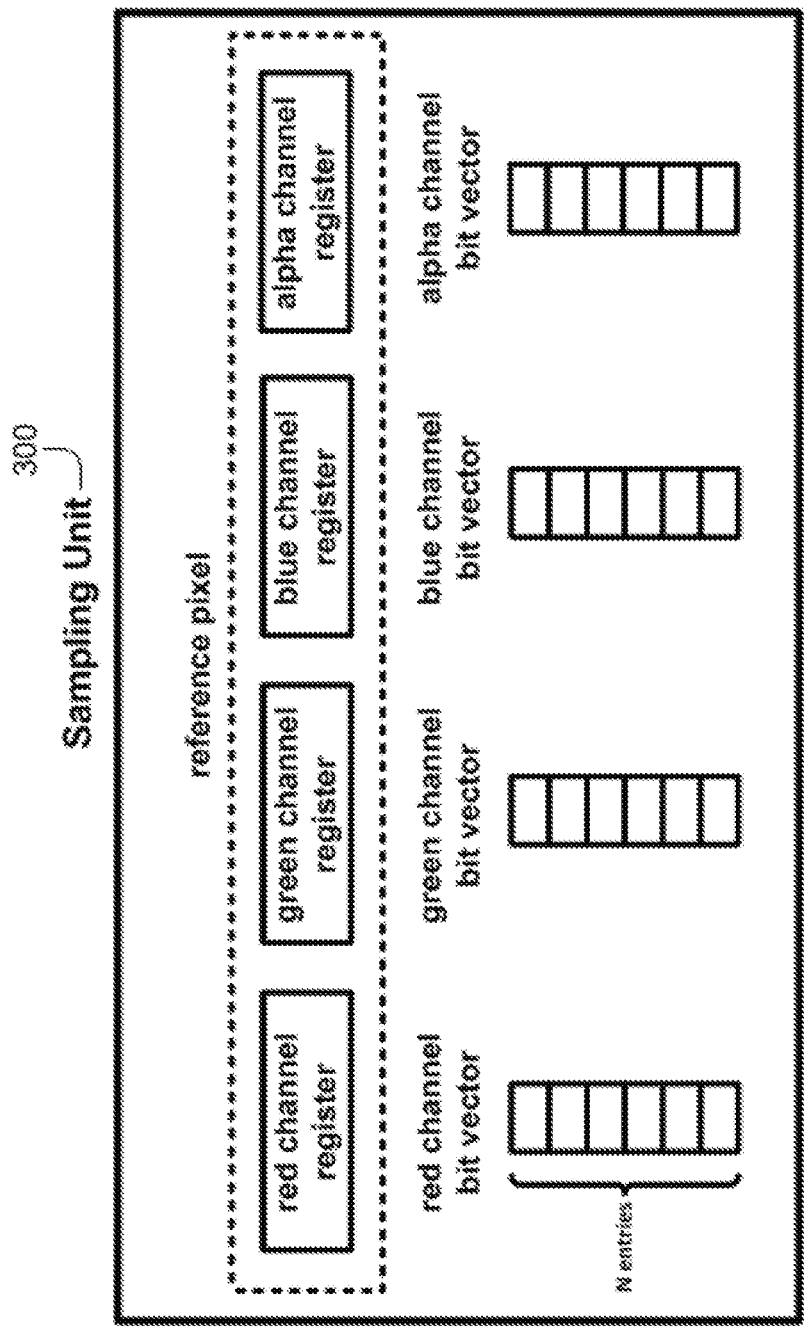
FIG. 3a illustrates a preferred embodiment of the pixel sampling unit which is suitable to guide the lossless compression operations in accordance with the aspects proposed in the present invention.
Figure 3B:
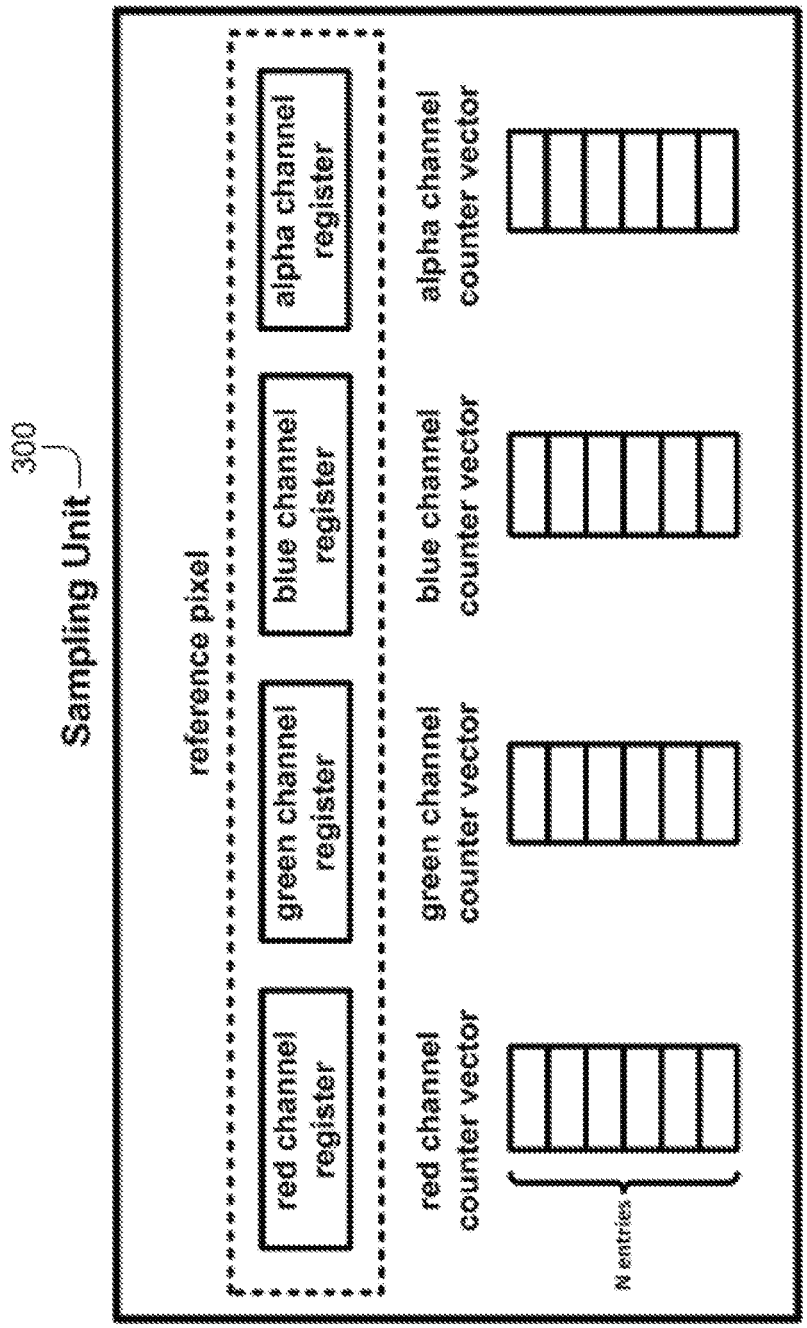
FIG. 3b illustrates a preferred embodiment of the pixel sampling unit which is suitable to drive the lossy compression operations in accordance with the aspects proposed in the present invention.

According to the first aspect of the technology provided in this invention, it is provided a method for capturing and storing at run-time the color characteristics of the pixels of a rendered tile. This process is performed at run time i.e., when the tile rendering logic generates (produces) the color data of each pixel belonging the rendered tile. The unit that performs this process is called sampling unit or SU and specific embodiments of the SU are shown in FIG. 3a and FIG. 3b. Upon the rendering of a new tile is finished, the information captured and stored in the SU will be used for two purposes described hereafter.

In a preferred embodiment and as can be recognized by those skilled in the art, an instance of the information stored in the SU (which in essence corresponds to the newly generated tile) may act as a representation of the color data residing in the newly generated tile i.e., it may serve as a signature of the newly generated tile. The applicants are aware of various other approaches (US2011/0074800, US2011/0102446) which attempt to derive suitable hash values or signatures from image tiles or from image blocks (by relying on common standards like checksums, CRC, MD5, SHA-1, etc.), but those approaches cannot be effectively utilized to guide (type of compression) or to control (compression ratio) the way in which, the rendering tiles should be compressed.

In an another particularly preferred embodiment and as it can be recognized by those skilled in the art, an instance of the information stored in the SU (which in essence corresponds to the new generated tile) can be used to identify the refresh or the updating rate of the corresponding tile. For example, by comparing the information captured by the SU during the rendering of a newly generated tile and the SU information which has been created during the generation of a tile (with the same coordinates) of the previous frame, it is possible to extract the update or refresh rate of the given tile. As it will be discussed later in this invention, if the refresh or the updating rate of a given tile is relatively high, this means that an aggressive lossy compression scheme can be applied in the tile without significantly reduce the image quality.

There is a plurality of arrangements that the SU can be architected. Two SU arrangements can be seen in FIG. 3a and FIG. 3b. However different arrangements are also possible. Although, as it can be understood by those skilled in the art, the generation and storage of the appropriate data into the SU hardware array will require some processing and memory resources, the applicants believe that this will be outweighed by the potential savings in terms of memory bandwidth that can be provided by the present invention.

The role of the SU is to create a representative "stamp" of the color data present in a newly generated tile. Having this information, the CU will be able to operate in the tile pixel data and compact (i.e., compress) them in a lossy or a lossless fashion or even a combination of a lossy and a lossless scheme.

The information stored in the SU for each newly generated tile can be used to assist the CU to configure the lossless compression process so as the tile compression ratio is maximized. In case of a lossy compression scheme is selected for compression, the SU information can be used to control the amount of data lost during the compression process, thus keeping the error rate due to the lossy compression process below predefined thresholds. Therefore, as it can be understood by those skilled in the art, the SU offers a mean to formulate adaptive tile compression schemes with controllable error rate.

One preferred embodiment of the SU can be seen in FIG. 3a. The specific embodiment represents the most frugal version of the SU, although other SU embodiments may be more effective. Assuming an HD graphics system using 8-bits RGBA color planes, the SU can be as simple as two 32-bit registers and the associating logic.

In this embodiment, the first register will store the 32-bits of the reference pixel (assuming again an HD graphics system using 8-bits RGBA color planes) and the second register will be storing the maximum arithmetic difference (e.g., using 2's complement logic while other representation formats are possible) between the reference pixel and every new generated pixel in a per-channel basis. The applicants would like to make clear that the update of the SU memory array is performed on the fly during the generation of a new tile.

A key point, as it will be understood by those skilled in the art is that the information (arithmetic differences) captured by the SU is stored in a per-channel rather in a per-pixel basis. The applicants have identified that such arrangement is proven to be the most beneficial one leading to significantly higher compression ratios, as it will become more clear later in this invention.

In another preferred embodiment, the SU can be "vectorized" in order to gather the frequency of the resulting arithmetic differences as they are appearing during the generation of the tile color data. While other SU embodiments are also possible, the latter embodiment is preferable because the gathered information can be combined with the information provided by the FUU in order to further improve the compressibility of the tile without significantly compromising the image quality. Of course and as it is further explained later in this application, the target in this case is to compress the new generate tile in an adaptive lossy fashion, while keeping the amount of color data lost during the lossy compression process minimal (in other words, the compression error rate is controllable).

According to the second preferred embodiment, the number of entries required in the per-channel tables can be defined in various ways. In a specific arrangement and assuming again an HD graphics system using 8-bits RGBA color planes (although this is not necessary) the counter associated with the first entry in each channel table may correspond to the number of occurrences of the tile color data that can be represented with a two-bit 2's complement number with respect to the respective reference color data. Accordingly, the second entry in each channel table may correspond to the number of occurrences of the tile color data that can be represented with a three-bit 2's complement number with respect to the respective reference color data. In this way, the seventh (and last) entry in each channel table can correspond to the number of occurrences of the tile color data that can be represented with a eight-bit 2's complement number with respect to the respective reference color data. Of course, a different encoding of the per-channel table entries is also possible.

Another design point is how to select the reference pixel per tile i.e., the color values (e.g., four color values in a RGBA system) that will be acting as reference color values. All the other color values in the tile will be expressed as the arithmetic difference between each color value and the reference color value. The applicants want to state that the reference pixel can be any pixel belonging in the tile under compression or it can be a pixel that does not belong to the tile under compression.

In a preferred arrangement, the reference pixel can be the "first" pixel of the tile (the pixel residing in the upper leftmost part of the tile). In another preferred arrangement, the reference pixel can be the most frequent pixel values in the tile independently of the pixel coordinates. In a third preferred arrangement, which according to the applicants is the most suitable one, the reference pixel can be the first rendered pixel in the tile independently of the pixel coordinates. As is known by those skilled in art, in a tile based graphic processing system, a pixel can be rendered multiple times until the rendering of the whole tile is finished (a new tile will be inserted in the graphics pipeline). In this case, the first rendered pixel can be used as reference point even if the given pixel will not appear in the final tile.

Figure 4:
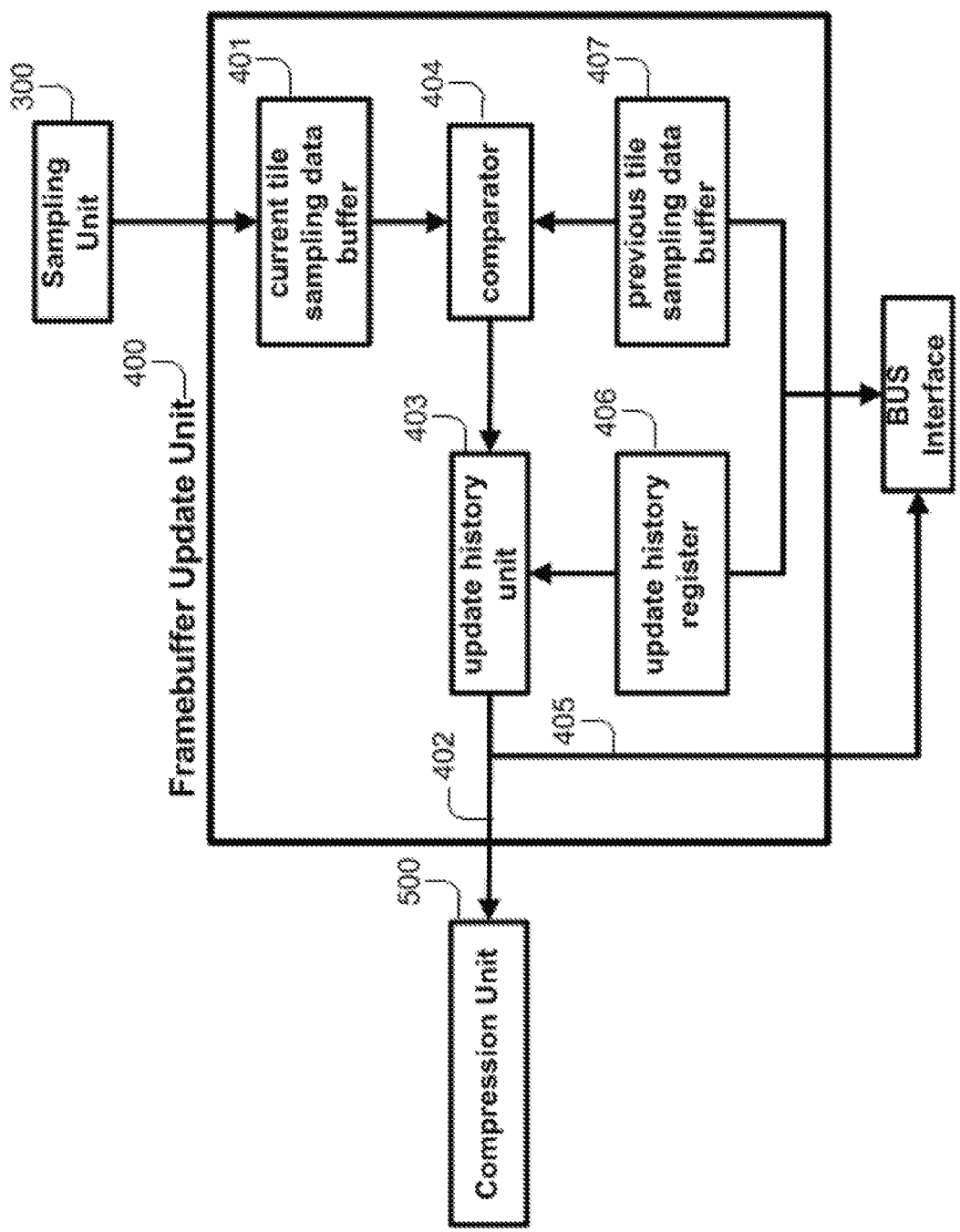
FIG. 4 illustrates a block diagram of a preferred embodiment of the framebuffer update unit in accordance to the aspects in the present invention.

According to the second aspect of the technology provided in this invention, there is provided a method of capturing and storing at run-time the refresh or the update rate of the image frames on a per-tile basis during the operation of the tile rendering graphics processing system. In the specific arrangement described in this invention, a unit called Framebuffer Update Unit or FUU is dedicated to this purpose. FIG. 4 depicts the block diagram of the FUU which is in accordance to the technology presented in this invention.

In a particularly preferred embodiment, the FUU controls one or more aspects of the way in which the CU compresses each generated tile. (i.e., the compression ratio and the type of compression which can be either lossless or lossy). More specifically, the FUU targets to predict if the new generated tile is identical or almost identical with the tile already stored in the framebuffer.

In essence, and as will be discussed further below, the FUU operates to compare successive tiles corresponding to successive output frames that are being generated for display, and then controls, in the present embodiment, the type of compression and the compression ratio that must be applied in the newly generated tile. In effect, the comparison hardware assesses whether successive output frames differ from each other, and if they do, a more aggressive lossy compression method is used to compress the newly generated tile (of course, and as will be discussed later, the exact determination of the aggressiveness of the compression process is subject to one or more predetermined update rates).

The FUU 400 receives two inputs. The first input is the contents of the SU of the newly generated tile. The second input is the tile SU 300 contents that have been produced during the generation of the previous output frame. According to a specific arrangement of the present invention, the SU contents of the tiles created during the generation of the previous output frame are stored in the framebuffer in memory, although other arrangements are also possible (for example, a dedicated on-chip memory can be used for this purpose).

Figure 6:
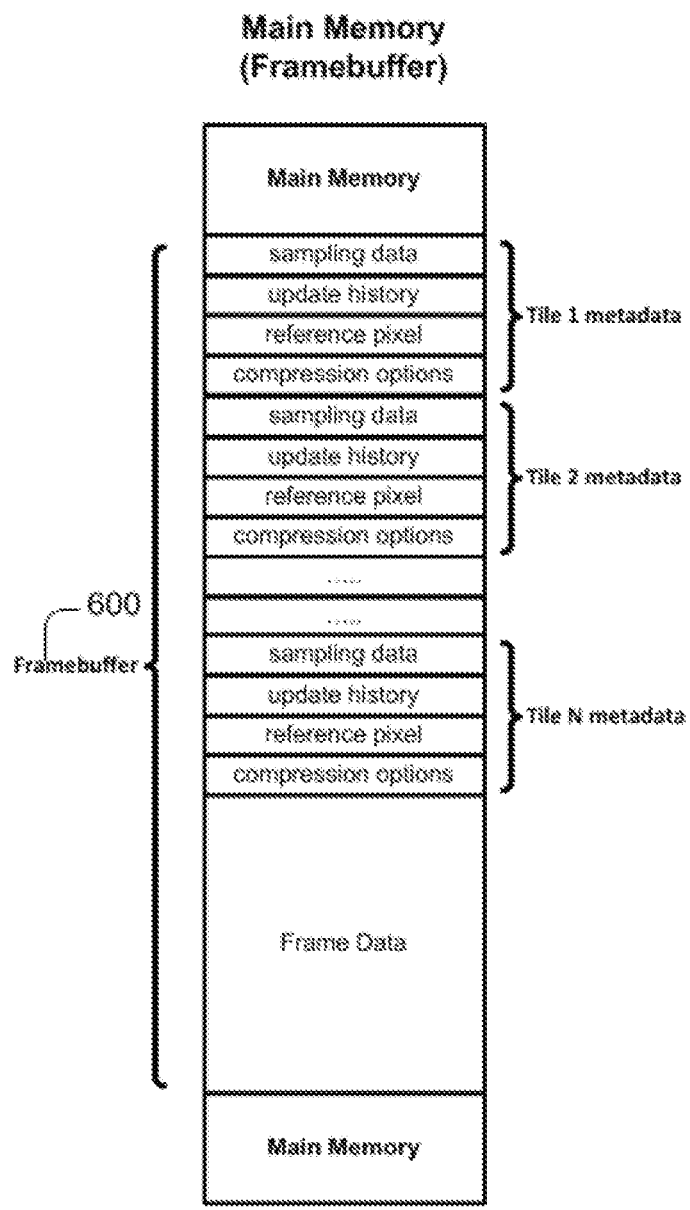
FIG. 6 illustrates a framebuffer organization which is in accordance with the aspects in the present invention.

The comparison process aims to compare equivalent tiles, that is, tiles with the same screen coordinates or tiles occupying the same position in the framebuffer. The comparison of the newly generated SU content with the SU content stored in the framebuffer can be carried out as desired and in any suitable manner. The comparison is preferably so as to determine whether the new tile block is the same with or at least sufficiently similar to the one stored in the framebuffer in memory. Similarity can be evaluated by the difference between the two tile "stamps". If the comparison logic identifies that the two SU contents are not similar, the SU content of the newly generated tile is forwarded and stored in memory (FIG. 6). In a preferred embodiment, the results of the comparisons are transferred in a hardware unit called update history unit 403.

FIG. 4 shows the configurations of the comparison and control hardware used in this embodiment which corresponds to the FUU unit 400. As shown in FIG. 4, the comparison hardware 404 receives the SU contents of the newly generated tile 401 and the SU contents of the equivalent tile produced during the generation of the previous frame 407 (which is retrieved from the framebuffer). The SU of the latter tile is temporarily stored in an on-chip buffer 407. As mentioned, the result of the comparisons is forwarded in a hardware unit called update history unit. Thus, the update history unit 403 receives the results of the comparisons in a tile-by-tile basis.

In parallel to the process just described in this embodiment, the update history unit is responsible to fetch from the framebuffer the history of the updating rate of the newly generated tile. In a specific arrangement of the present embodiment, the update rate history of all the tiles is stored in the framebuffer (see FIG. 6) in a desired format. Upon a fetch request is issued, the history of the newly generated tile is temporally stored in an on-chip buffer 406. As a subsequent step, the update history unit is responsible to update the history of the newly generated tile based on the result provided by the hardware comparator unit 404. After this step is finished, the newly created tile history is returned back (stored) to the framebuffer through a write transaction 405 and it is forwarded to the CU 500 through link 402 for further processing as explained below.

In the current embodiment, the update history of all the frame tiles is stored in the framebuffer in memory, however other arrangements are possible (e.g., to store the update history in a dedicated on-chip memory or to cache the update history of the most frequent tiles).

FIG. 6 shows an exemplary memory layout for storing the framebuffer and corresponding tile information in the memory. The tiles making up the frame are stored in one portion of the memory (called Frame Data in FIG. 6) and the associated information for each tile (called tile metadata information) is stored in another portion of the memory. Other arrangements, of course, are possible.

According to the third aspect of the technology described in this invention, the power and bandwidth consumed by the framebuffer can be significantly reduced by compacting the data of the rendered tiles, a technique also known as framebuffer compression. The applicants are aware of the various prior art framebuffer compression schemes, however they deem that those techniques have their own drawbacks or/and disadvantages. The state-of-the-art framebuffer compression techniques are either too complex and/or inefficient in tile based systems.

For example, Huffman coding compression techniques, while they are the best known lossless variable length encoding techniques, they are time and memory consuming since they require the symbol frequencies (pixels or color-planes in the context of this intention) to be known before the frame or tile generation. Arithmetic coding compression techniques guarantee lossless optimal encoding, but also require expensive iterative encoding and decoding procedures. The popular Lempel-Ziv-Welch (LZW) compression scheme is a single-pass fixed-length lossless encoding technique which replaces a string of symbols with a single code word using a sliding dictionary. However, this technique also requires expensive hardware modules to create the encoding and decoding functionality and most importantly is not suitable for tile based rendering systems due to the run-time generation of the sliding dictionary. Finally, dynamic color depth control, is a "lossy" compression technique which if it is not performed carefully will significantly reduce the image quality.

Furthermore, the applicants believe that none of those techniques is tailored to the operation of a tile based graphics processing system. The prior art compression techniques are designed to optimize the compression ratio of a complete output frame and as it can be recognized by those skilled in the art, those schemes are not effective enough when they operate in a tile basis. The applicants believe therefore that there remains scope for improvement to framebuffer compression techniques used for tile rendering graphics processing systems.

More specifically, the applicants deem that what is needed in the art (in accordance to the methods and apparatus described in the present invention) is an adaptive framebuffer compression scheme (dedicated to a tile based rendering graphics processing system) that will be able to formulate informed compression decisions (type and aggressiveness of the compression scheme) based on various parameters defined either by the graphics application (e.g., refresh or updating rate of the rendered images), the user requirements (e.g., rendering quality requirements set by the user), and/or the run-time conditions of the rendering device (e.g., the remaining battery life of a portable device or the lighting conditions of the environment in which the graphic device operates).

Most importantly, the compression process must be carefully performed so as to minimize the visual artifacts in case a lossy compression algorithm is selected for compression. Of course, the compression ratio achieved by the disclosed compression scheme should be accordingly maximized (for power and memory bandwidth savings), but in a way that the amount of data lost during the compression process is controllable i.e., what is needed in the art is an adaptive lossy framebuffer compression scheme with controllable error rate.

In this case and in accordance to the technology disclosed in this application, the error rate can be controlled either by the requirements defined by the graphics application (e.g., refresh or updating rate of the rendered images), either by the requirements defined by the user (e.g., rendering quality requirements set by the user), either by the run-time conditions of the rendering device (e.g., the remaining battery life of a portable device or the lighting conditions of the environment in which the graphics device operates), either by a combination of the above parameters.

Based on the above observations made by the applicants, a first embodiment of the compression methodology (which is in accordance with the technology described in this invention) advocates for a lossless, differential or delta compression scheme suitable for tile based rendering graphics systems. As known by those skilled in art, differential or delta compression encoding is a way of storing (or transmitting) data in the form of differences (often called deltas) between sequential data rather than initial set of data. From a logical point of view, the difference between two data values is the information (usually represented as the arithmetic distance using 2's complement logic) required to obtain one value from the other.

In contrast to previous differential or deltas compression schemes in which the differences or the deltas are expressed as the arithmetic distance between sequential data, in all the arrangements proposed in the present invention, the differences or the deltas are expressed as the arithmetic distance between the current color data or pixel and a reference color data or pixel. This pixel has the same reference color data captured by the Sampling Unit during the generation of a tile.

Furthermore, as it is also known by those skilled in art, the differential or delta compression schemes are not appropriate for compressing information created using a very large number of symbols such as color values represented by relatively long integers (e.g., 32-bits for RGBA pixels). The applicants have recognized this shortcoming and in all the arrangements proposed in the disclosed invention, the differential or delta compression scheme operates in a per color plane level in contrast to similar prior compression schemes that typically operate on pixel level.

The applicants have identified that working on the color plane level will maximize the effectiveness (i.e., the compression ratio) of the delta or differential compression for the following two reasons: i) the color depth of a color plane is significantly smaller (e.g., 8 bits in HD graphics) in contrast to the pixel level (e.g., 32-bits in HD graphics), and ii) the proposed compression scheme is applied in a tile by tile basis and as a result the differences between the colors belonging to same tile (and of course to the same color plane) are expected to be significantly smaller compared to the case in which the same technique would be applied in the frame (image) level.

Thus, based on the two beneficial arrangements that have been identified by the applicants and analyzed previously in this invention, in the first embodiment of the compression method presented in this application a lossless, differential or delta compression scheme is presented thereafter.

Figure 5:
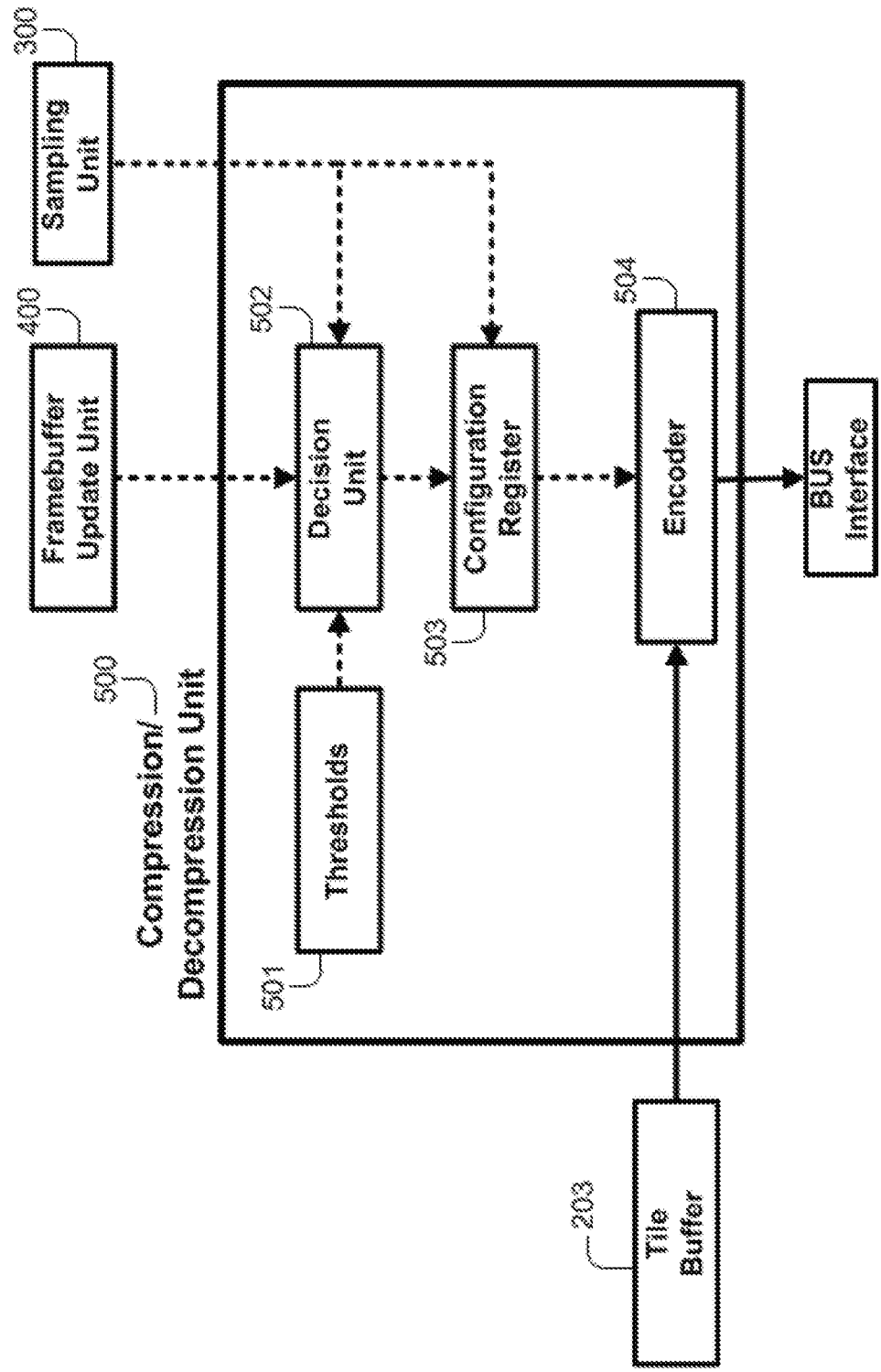
FIG. 5 illustrates a block diagram of a preferred embodiment of the compression unit in accordance with the aspects in the present invention.

According to the first embodiment, the applicants have identified that the effectiveness in terms of compression ratio achieved by the Compression Unit (CU) of the proposed compression scheme is maximized by utilizing the information captured by the Sampling Unit (SU). A specific arrangement of the CU, which is in accordance with the present embodiment, is illustrated in FIG. 5.

In general, a critical design parameter of all the delta or differential compression techniques is how to define the range of information (i.e., the number of bits) required to express the deltas between any given color data with respect to the reference color data. Of course, if the reference color data is 8-bit long (assuming an HD graphics system using 8-bits RGBA color planes) and the deltas are expressed in a 8-bit long format (e.g., using 2's complement logic), then no compression benefits will be achieved and the compression process is considered as lossless.

In accordance to the first embodiment of the compression methods and apparatus provided in the present invention, the amount of information (i.e., the number of bits) required to express the deltas is defined by the information captured and stored in the SU hardware module during the tile generation/rendering process.

The arrangement of the SU hardware module that is illustrated in FIG. 3a can serve exactly this purpose. As mentioned, the arrangement in FIG. 3a (assuming an HD graphics system using 8-bits RGBA color planes) consists of two 32-bit registers and the associating logic. The first register stores the 32-bits information of the reference pixel (assuming again an HD graphics system using 8-bits RGBA color planes) and the second register will be storing the maximum arithmetic difference (e.g., using 2's complement logic while other representation formats are possible) between the reference pixel and every new generated pixel in a per channel basis. In other words, the SU hardware contains the maximum arithmetic distance (i.e., the number of bits required to express the deltas is calculated through a simple combinational circuit) between each color data in the tile and the reference color data in a per-color channel basis (not shown in the figures).

Upon the generation of a tile is finished, the information stored in the SU module 300 (two 32-bits registers) is immediately forwarded to the configuration register 503 of the CU hardware 500. At this point, the encoder 504 is able to start the compression process (taking into account the information stored in the configuration register) of the newly generated tile (stored in the on-chip tile buffers 203a or 203b). In this way, a lossless compression is performed, while the compression benefits (i.e., compression ratio) can be maximized, since the operation of the SU dictates the appropriate number of bits required to express the deltas (assuring at the same time a lossless compression). Finally, in case of a lossless compression is performed (as in the current embodiment), the thresholds 501 and the decision unit 502 hardware modules are bypassed (deactivated).

In a second particularly preferred embodiment of the compression methods and apparatus provided in the present invention, an adaptive lossy compression technique with controllable error rate is introduced. In the context of the present invention, the error rate is defined as the amount of information lost during the lossy compression process.

For all the embodiments described hereafter in the present invention, the second arrangement of the SU hardware module is utilized (illustrated in FIG. 3b). As it will become clear later in this invention, the second arrangement of the SU hardware is able to facilitate the lossy compression process in a way that informed compression decisions can be issued without significantly compromising the quality of the rendering images.

As mentioned, the arrangement in FIG. 3b corresponds to a compact representation of the tile color data. More specifically, each table entry in the SU arrangement in FIG. 3b is associated with a counter and there is one table for each color plane, although this is not necessary (e.g., one table for all the color planes is also possible). Initially and before the generation of a new tile, all the counters (table entries) are cleared. When a new color data of the generating tile is computed, one of the table counters is increased by one. For example, assuming an HD graphics system using 8-bits RGBA color planes, the counter associated with the first entry in each channel table may correspond to the number (occurrences) of the tile color values that can be represented with two-bit long arithmetic distances with respect to the reference color data. Accordingly, the second entry in each channel table may correspond to the number (occurrences) of the tile color data that can be represented with a three-bit long arithmetic distances and so on so forth.

In essence, the second arrangement of the SU hardware is able to provide valuable feedback about the amount of information that will be lost when a lossy compression scheme will be selected to compress the color data of the newly generated tile. For example, if the information stored in the SU hardware indicates that the 95% of tile color data can be expressed using three-bit long arithmetic distances (with respect to the reference color data), this means that only the 5% of the color data will be erroneously represented if three-bit long deltas are selected. In this scenario and assuming a 16×16 tile organization, only about 13 (out of 256) pixels will be represented with reduced quality, while a compression ratio more than 50% will be achieved. In other words, the image quality reduction will be limited to 5% or, the upper bound of the error rate will be set to 5%.

If one wants to increase or to decrease the controllable error rate, then a different number of bits could be selected to record the deltas of the proposed arithmetic compression scheme trading-off between the quality of the rendering images and the compression ratio of the framebuffer data. Thus, the information captured by the SU hardware can be utilized to provide informed compression decisions (i.e., driving the aggressiveness of the underlying compression scheme) in a lossy, more lossy, less lossy or even a lossless fashion and most importantly in a way that the amount of tile information lost during the lossy compression process is controllable (subject to predefined thresholds).

Therefore and in accordance to the second embodiment of the compression methods and apparatus provided in the present invention, the information captured by the SU hardware can be combined with the refresh or updating rate of each tile. As noted, according to embodiments described in this application, there is a specialized hardware module (called FUU dedicated to capture the refresh rate or the updating rate of each tile in the system).

The decision unit 502 of the CU hardware 500 is responsible to define the appropriate number of bits (i.e., length of deltas) that should be used to express the arithmetic differences (i.e., the deltas) in the proposed adaptive compression scheme. Deltas of different ranges may be applied to each tile in the output frame, while in a preferred arrangement of all the embodiments of the compression methods provided in the present invention (and in order to keep the complexity of the proposed compression schemes low), the maximum delta range is applied to all the data colors independently of the color channel. Of course different arrangements are also possible (e.g., using different deltas for each color channel).

The decision unit 502 receives as inputs the information provided by the FUU 400 and the information stored in the SU 300 and appropriately configures the configuration register 503. Upon this step is finished, the encoder 504 starts the compression process and the tile color data are finally forwarded in the framebuffer in memory (FIG. 6) in the desired format (as it is defined by the information in the configuration register).

Preferably, the decision unit 502 uses some form of threshold or thresholds 501 or values (parameter or parameters) to determine the appropriate ranges of the delta values in addition to the information provided by the FUU and the SU. As mentioned, the role of the decision unit is to set the configuration register with the appropriate compression parameters (ranges of deltas or number of bits required to express the deltas) according to which the compression process should be performed.

The threshold values that are provided as inputs to the decision unit 502 can be either static (predetermined) or adaptive. In a particularly preferred arrangement, the threshold values are predefined and remain constant during the operation of the system. Of course, the predefined values should be set in a way to reduce the visual artifacts of the rendering tiles. For example, the input provided by the FUU 400 can be used by the decision unit to classify the new generated tiles as static (or almost static), as changing in a modest rate or as rapidly changing tiles (of course formulating more or less categories is also possible). To each of those categories, a desired compression error rate will be assigned. For example, for the tiles belonging to the first category, the error rate (produced during the lossy compression process) should not exceed the lowest threshold (e.g., 5%), while higher error rates can be allowed for the tiles belonging to the second and the third category (e.g., 15% and 25% respectively).

Furthermore, the applicants want to state, an important characteristic of all the embodiments of the compression methods presented in this invention: the threshold values (either static or adaptive) associated to each category should be considered as an upper bound of the allowable error rate produced during the lossy compression process. In other words the decision unit will automatically throttle the aggressiveness of the compression process in order to produce errors below the allowable upper bound, even by turning the lossy compression into a lossless one.

If, for example, assuming an HD graphics system using 8-bits RGBA color planes and in accordance to the previous example, a tile is categorized as a highly changing tile, but even by reducing the range of deltas by a single bit (i.e., to 7-bit long deltas) will result to an error rate which exceeds the higher threshold error rate value (e.g., 25% in accordance to the previous example), the decision unit 502 will automatically decide to not compress the current tile or to skip the compression process (in this case 8-bit long deltas will be used).

Alternatively, assuming again an HD graphics system using 8-bits RGBA color planes and in accordance to the previous example, if a tile is categorized as a highly changing tile, but by reducing the range of deltas by three bits (i.e., to 5-bit long deltas) will result to an error rate above the higher threshold value (e.g., 25%), while by reducing the range of deltas by two bits (i.e., to 6-bit long deltas) will result in an error rate equal to zero (i.e., the compression process will be performed in a lossless fashion in this case), then the decision unit 502 will select to proceed with 6-bit long deltas i.e., with a lossless compression scheme.

As a result, a unique feature of all the embodiments of the compression methods and apparatus presented in this invention is that the compression process is adaptable to the special characteristics of the tiles of the output images. The compression process is automatically performed in a lossless or a lossy fashion based on the characteristics of the newly generated tile and most importantly in case in which a lossy compression is selected, the upper bound of the amount of data lost during the compression process (i.e., the error rate) is controllable (determined by predefined threshold values).

Finally, the operating values of the thresholds should be identified after analyzing various parameters of the graphics system such as (but not limited to) the depth of the color data produced by the tile rendering process and/or the effectiveness and quality of the rendering algorithms used by the graphics processing system (e.g., anti-aliasing algorithms).

In accordance to the third embodiment of the compression methods provided in the present invention, the threshold values as they are defined in the previous embodiment (second embodiment) can be accordingly altered or set by the system user. If, for example, the user intents to play a low graphics complexity game, the threshold values can be respectively increased, since no visual artifacts will be experienced by the user. On the other hand, in high graphics complexity games, the respective thresholds values should be accordingly decreased in order to minimize the upper bounds of the error rate that may occur during the storing of the frame data in the framebuffer.

Again, the operating values of the thresholds should be identified after analyzing various parameters of the graphics system such as (but not limited to) the depth of the color data produced by the tile rendering process and/or the effectiveness and quality of the rendering algorithms used by the graphics processing system (e.g., anti-aliasing algorithms).

In accordance to the fourth embodiment of the compression methods provided in the present invention, the threshold values as they are defined in the second embodiment of the compression methods can be accordingly altered or set by specific run-time conditions of the rendering hardware. Typical cases belonging in this category can be (but not limited to) the remaining battery life if the graphics hardware is hosted in a portable device or even the lighting conditions of the environment in which the graphic device operates).

Even in this case, the operating values of the thresholds should be identified after analyzing various parameters of the graphics system such as (but not limited to) the depth of the color data produced by the tile rendering process and/or the effectiveness and quality of the rendering algorithms used by the graphics processing system (e.g., anti-aliasing algorithms).

In accordance to the fifth embodiment of the compression methods provided in the present invention, the threshold values as they are defined in the second embodiment of the compression methods can be accordingly altered or set taking into both the quality of service requirements set by the system user and the specific run-time conditions of the rendering hardware.

The operating values of the thresholds should be again identified after analyzing various parameters of the graphics system such as (but not limited to) the depth of the color data produced by the tile rendering process and/or the effectiveness and quality of the rendering algorithms used by the graphics processing system (e.g., anti-aliasing algorithms).

In accordance to the sixth embodiment of the compression methods provided in the present invention, a two level compression approach is also proposed in order to further increasing the compression benefits. At the top level of the proposed two level scheme, a single pass, run-length encoding approach is proposed to be used. At the bottom level, any of the previous five embodiments can be utilized to compress the tile color data in a lossy or a lossless fashion. In other words, the color data compacted by any of the previous five embodiments are now exposed to the top level of the proposed two level compression scheme for further compressing (i.e., an extra layer of compression is introduced before the color data are finally sent to the framebuffer in memory).

The run-length encoding mechanism aims to capture and encode multiple color data that are similar as a single entry. More specifically, the encoder 504 of the CU scans sequentially the color data and compares the new data with the previous one and increments a counter if they are equal. The purpose of this simple, lossless, run-length encoding scheme is to substitute one or (preferably) multiple color data with a single color value and a count corresponding to the occurrences of the same color value in the color data stream. Like in all the previous five embodiments of the compression methods, the run-length encoding technique is configured to operate at the color plane level rather on the pixel level.

One parameter that should be defined during the implementation of the proposed run-length encoding scheme is the size of the length counters (number of bits required for the length counters). In addition, multiple length counters of various sizes can be used (one for each color plane) instead of a single length counter size for all the color planes trading off the compression ratio and the storage requirements and the associating logic.

The exact number of the length counters and the size (in bits) of them are system dependant. These design parameters are extracted after analyzing (e.g., via profiling) various other parameters of the graphics system such as (but not limited to) the depth of the color data produced by the tile rendering process and/or the quality and effectiveness of the rendering algorithms used by the graphics processing system (e.g., antialiasing algorithms).

The applicants would like to state that all aspects and embodiments of the present invention do not refer and/or do not control the way which the graphics processing system and/or the graphics processor generates the output tiles of the frames. The tiles can be generated in any desired framebuffer format (e.g., using any number of bits per color plane and using RGBA or RGB color representation). The aspects and embodiments of the present invention refer to or control the way which the output tiles are stored in the framebuffer in memory.

The present invention discloses methods and apparatus for controlling the framebuffer traffic in a tile rendering graphics processing system. The framebuffer traffic is reduced by an adaptive compression technique which can be either lossy or lossless. If a lossless compression scheme is selected, specific embodiments and arrangements have been described in the present invention in order to maximize the compression ratio of the framebuffer color data and accordingly reduce the read and write transactions to the framebuffer in memory. If a lossy compression scheme is selected, specific embodiments and arrangements have been described in order to carefully throttle the aggressiveness of the compression scheme so as the amount of errors created during the lossy compression process is below predefined error rates. The error rates can be set either by the graphics application itself (e.g., refresh rate of the rendered tiles), the user requirements (e.g., quality of service requirements set by the user), the run-time conditions of the system (e.g., the remaining battery life of a portable device), or a combination of the above parameters.

If we assume that a 32-bit DDR-SDRAM transfer consumes about 1 nJ per 32-bit transfer and if one considers only first order effects of framebuffer accesses only, and ignoring for example on-chip interconnect power consumption, graphics processor framebuffer accesses consume about $(1920 \times 1080 \times 4) \times (1 \text{ nJ}/4) \times 2 \times 60 \text{ Hz} = 250$ mW and 948 MB/s for HD graphics at 60 fps and $(1024 \times 768 \times 4) \times (1 \text{ nJ}/4) \times 2 \times 60 \text{ Hz} = 94$ mW and 360 MB/s for $1024 \times 768$ resolution displays at 60 fps.

If one is able to eliminate 40% of the framebuffer traffic (by using the methods and apparatus described in this invention) that would save about 100 mW and 379 MB/s for HD composition framebuffer and 38 mW and 144 MB/s for $1024 \times 768$ graphics. Thus, bandwidth and power savings when using the methods and apparatus described in this invention can be relatively significant.

While the invention has been described in conjunction with several specific embodiments, many further alternatives, modifications, and variations will be apparent to those skilled in the art in light of the foregoing description. Thus, the invention described in the present document is intended to embrace all such alternatives, modifications, and variations as may fall within the scope of the included claims.

What is claimed is:

1. A graphics processing unit (GPU) configured to perform adaptive framebuffer compression with controllable error rate, the GPU comprising:
   a tile renderer, communicatively coupled with a first memory, the tile renderer generating one or more tiles, each tile comprising a plurality of pixels, grouped into color channels;
   the first memory storing therein at least a first tile and a consecutive tile, such that the first tile is consecutive to the second tile or vice versa, wherein the first memory is further communicatively coupled with a sampling circuit;
   the sampling circuit configured to generate a sample from a tile by comparing at least a pixel of the tile, and another pixel of the tile; and
   a compression circuit configured to determine, for each color channel, a compression scheme based on the per channel sample, and a threshold defining an input error, wherein an upper bound error rate is set to place an error rate of the input error below or at the upper bound error rate;
   wherein the compression scheme is configurable by one or more compression parameters, such that a degree of compression is at least one of: no compression, a lossless compression, and at least a first lossy compression, wherein different parameters are determined by the compression circuit for each color channel of the image data.

2. The GPU of claim 1, wherein the one or more compression parameters are adapted based on the update rate of the rendered tile.

3. The GPU of claim 2, wherein the GPU further comprises a frame buffer update circuitry (FBUC) configured to store metadata of rendered tiles, wherein the metadata comprises information based on the one or more compression parameters for each color channel of each tile, and reference pixel information for each tile.

4. The GPU of claim 1, wherein the compression circuitry, is further configured to generate a compressed tile based on: each selected compression scheme, the first tile, and a reference pixel of the first tile.

5. The GPU of claim 4, wherein the reference pixel is selected by the sampling circuit to serve as a reference point from which the per channel threshold is generated.

6. The GPU of claim 4, wherein the GPU stores the compressed tile in a framebuffer communicatively coupled with the GPU.

7. The GPU of claim 6, further communicatively coupled with a FBUC, the FBUC configured to:
   receive the first tile and a second tile;
   generate a difference value between the first tile and the second tile; and
   instruct the compression circuit to further select the compression scheme based on the generated difference.

8. The GPU of claim 1, wherein the sampling circuitry is further configured to determine a change frequency based on the per channel threshold, and wherein the GPU is further configured to select the compression scheme based on one or more of the change frequencies.

9. The GPU of claim 1, wherein the color channels are any of: red, green, blue and alpha.

10. The GPU of claim 1, wherein the threshold is based on a delta generated between the at least a pixel and the another pixel.

* * * * *